(12) United States Patent
Sayers

(10) Patent No.: US 7,481,256 B2
(45) Date of Patent: Jan. 27, 2009

(54) PROTECTIVE DEVICE FOR ROTARY LAWN MOWER BLADE

(76) Inventor: Charles P. Sayers, 20015 21 Mile Rd., Marshall, MI (US) 49068

(*) Notice: Subject to any disclaimer, the term of this patent is extended or adjusted under 35 U.S.C. 154(b) by 630 days.

(21) Appl. No.: 11/188,424

(22) Filed: Jul. 25, 2005

(65) Prior Publication Data
US 2007/0028578 A1      Feb. 8, 2007

(51) Int. Cl.
*B26D 7/22*      (2006.01)
(52) U.S. Cl. .................................................. 150/154
(58) Field of Classification Search ............... 30/151, 30/153; 56/17.4, 17.5; 150/154; 206/350, 206/352
See application file for complete search history.

(56) References Cited

U.S. PATENT DOCUMENTS

| | | | |
|---|---|---|---|
| 290,205 A | 12/1883 | Bronson | |
| 1,082,862 A | 12/1913 | Geschickter | |
| 1,607,602 A * | 11/1926 | Bindseil | 206/353 |
| 1,934,115 A | 11/1933 | Burns | 206/41 |
| 2,792,163 A | 5/1957 | Kidwell | 224/2 |
| 2,901,823 A | 9/1959 | Widen | 30/151 |
| 2,904,128 A | 9/1959 | Boham et al. | 182/108 |
| 3,042,087 A | 7/1962 | Otoupalik | 143/32 |
| 3,068,569 A * | 12/1962 | Campbell, Jr. | 30/294 |
| D251,822 S * | 5/1979 | Rojd | D8/8 |
| 4,306,600 A | 12/1981 | Lonsinger, Jr. | 150/52 |
| 5,148,916 A * | 9/1992 | Tillyer, Sr. | 206/352 |
| 7,086,156 B2 * | 8/2006 | McLaughlin | 30/153 |
| 2004/0231164 A1 * | 11/2004 | McLaughlin | 30/151 |
| 2006/0085989 A1 * | 4/2006 | Kuan Huo | 30/151 |

* cited by examiner

*Primary Examiner*—Jermie E Cozart
(74) *Attorney, Agent, or Firm*—Young Basile

(57) ABSTRACT

A protective device for a rotary lawn mower blade in the form of an open-ended envelope of flexible shape retaining material such as plastic. The envelope has a back panel and two overlapping front panels which are held together by means of a complemental bead and groove arrangement. Apertures are provided in the panels so that the protective device can be applied to the blade while the blade is attached to the lawn mower drive shaft. Trim indicia is also provided.

7 Claims, 4 Drawing Sheets

remainder truncated …

PROTECTIVE DEVICE FOR ROTARY LAWN MOWER BLADE

FIELD OF THE INVENTION

This invention relates to protective devices for rotary lawn mower blades and particularly to an open-ended plastic envelope which can be used to fully cover a rotary lawn mower blade while it remains attached to the lawn mower drive shaft, thus providing protection to persons performing service on the lawn mower and/or blade.

BACKGROUND

Motorized rotary lawn mowers, as opposed to reel mowers, generally have a shrouded housing within which an elongate rectangular steel blade with sharpened leading edges rotates on a vertical drive shaft. The blade is connected to the drive shaft by means of a threaded fastener. The blade needs service, such as sharpening or balancing, from time to time. Such service is best performed by first removing the blade from the drive shaft.

The removal of blade from the drive shaft is most safely performed by first protecting the operator from injury due to contact with the sharpened leading edges. The operator can protect himself by donning heavy gloves but this may make normal operations, such as adjusting and applying a wrench, more difficult. Alternatively, it is known to place protective sheaths around the opposite ends of the blade, one such arrangement being illustrated in U.S. Pat. No. 4,306,600 issued Dec. 22, 1981 to Charles Lonsinger, Jr. The Lonsinger device comprises two separate stitched sheaths which are interconnectable by means of a strap with snaps.

SUMMARY

The present invention provides an improved protective device for rotary lawn mower blades, which device can be easily attached to the blade while it is on the mower without interfering with the operations necessary to remove the blade from the mower and/or to reattach it. In general, the protective device of the present invention comprises a one piece, open-ended envelope of flexible shape retaining material such as plastic which is approximately the length and width of a rotary lawn mower blade, so as to be capable of receiving the blade substantially fully therewithin. The envelope has a back panel and two front panels, one of which overlies the other. Generally co-extensive openings are formed in the front and back panels centrally between the open ends to accommodate the drive shaft and blade fastener.

Another aspect of the present invention is a method of protecting a person servicing a rotary lawn mower blade from injury prior to or during service comprising the steps of placing the lawn mower blade within a one piece protective envelope of the type described above while the blade remains attached to the lawn mower drive shaft and, thereafter, removing the blade from the lawn mower while retaining the blade fully within the protective device.

DETAILED DESCRIPTION OF THE ILLUSTRATIVE EMBODIMENTS

Figure 1:
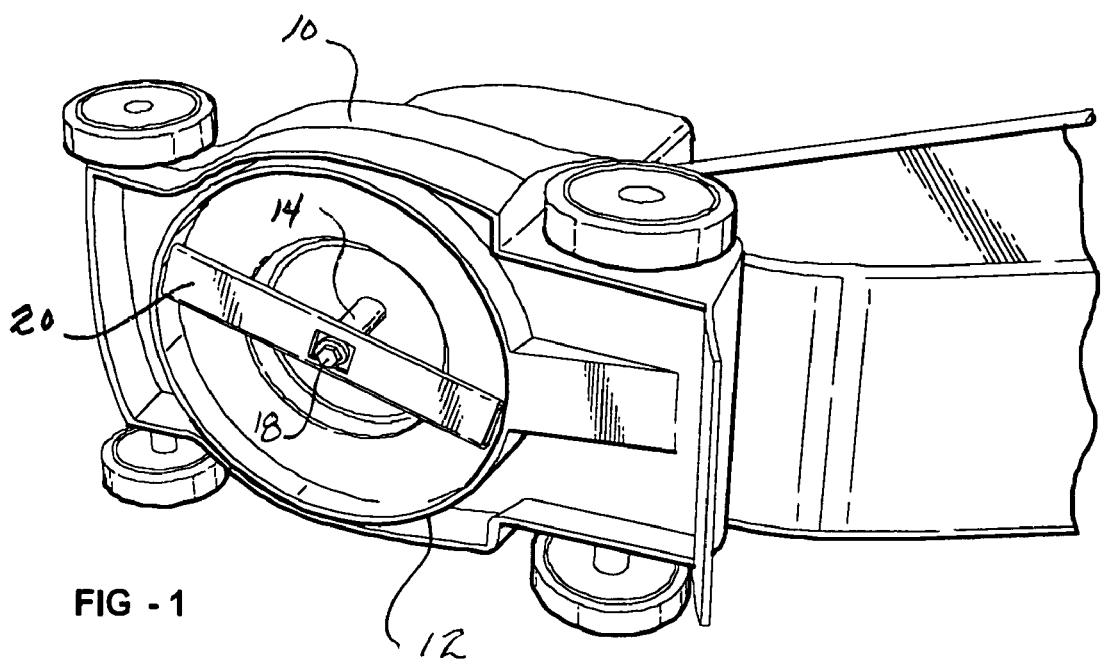
FIG. 1 is a perspective view of a rotary lawn mower showing the details of the blade mount and bottom shroud with the invention in place.

FIG. 1 illustrates a motorized rotary lawn mower 10 having a bottom blade shroud 12 of circular configuration and a drive shaft 14 centrally of the circular shroud 12. Attached to the drive shaft is an elongate rectangular steel blade 16 having sharpened leading edges 17. A threaded fastener 18 secures the blade 16 to the shaft 14. In accordance with the present invention, a protective device 20 is secured to and around the blade 16 to prepare the operator of the mower to remove the blade 16 from the mower 10 for service.

Figure 2:
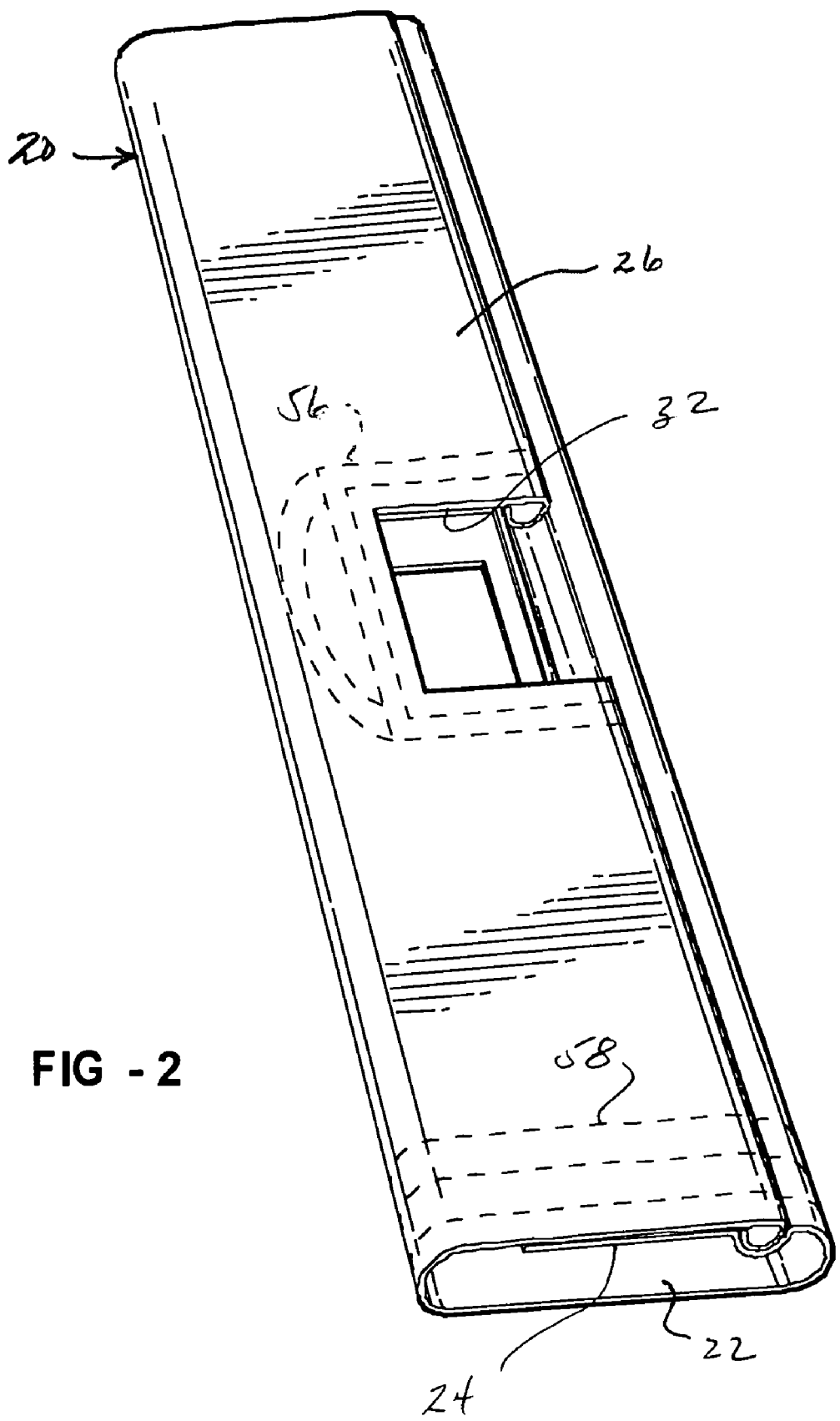
FIG. 2 is a perspective view of a first embodiment of the invention.
Figure 4:
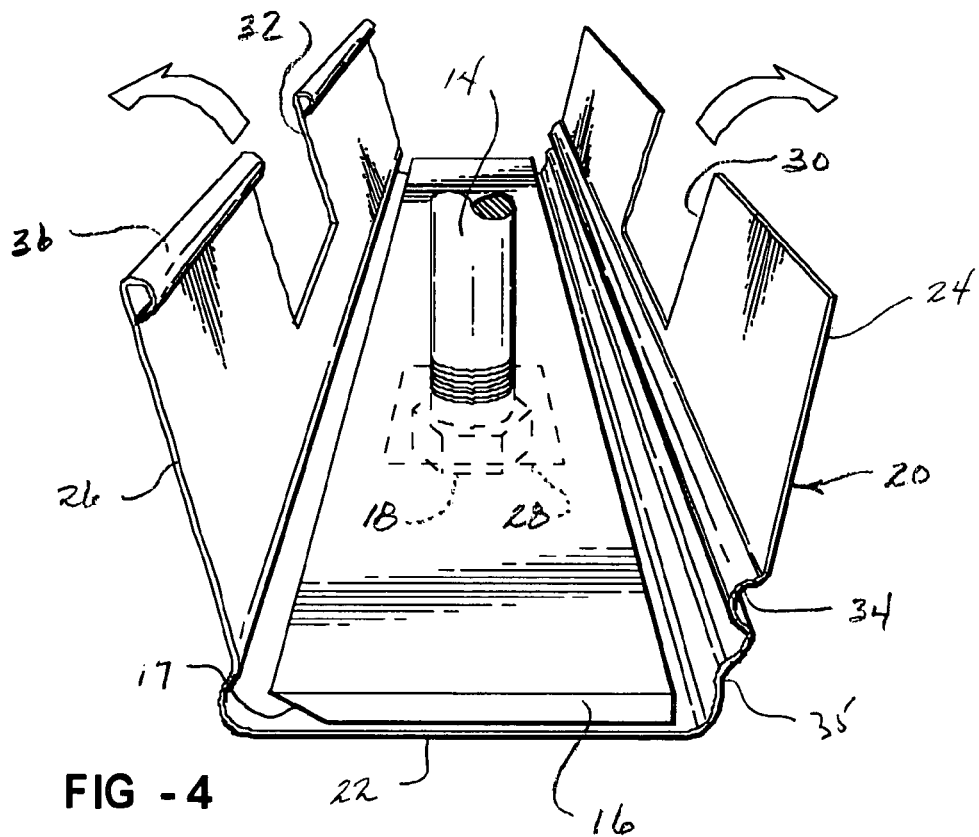
FIG. 4 is a view of the embodiment of FIG. 2 with the protective device in a flexed or opened condition for or during installation or removal thereof.
Figure 5:
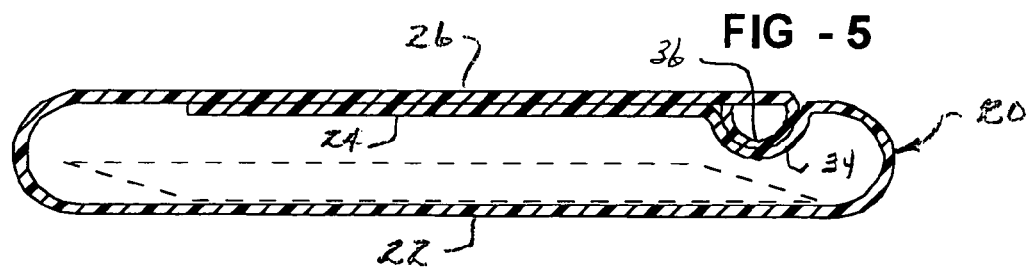
FIG. 5 is a sectional view of the embodiment of FIG. 2.

As illustrated in FIGS. 2, 4 and 5, the protective device 20 comprises an open-ended envelope of flexible, shape retaining material such as high or medium density polyethylene which can be extruded in sheet form and then heat molded to a folded shape which the material retains even though it might be flexed temporarily into a different shape. As shown in FIG. 4, the protective device 20 approximates the length and width of the rotary lawn mower blade 16 but is slightly larger than the blade in both width and length, thereby to be capable of receiving the blade substantially fully therewithin. Of course, suitable plastics other than polyethylene may be used. An example is PVC.

The envelope comprises a back panel 22 and overlapping front panels 24 and 26 of which 24 is the underlying panel and 26 is the overlying panel as best shown in FIG. 5.

The back panel is provided with a central aperture or opening 28 whereas the underlying front panel 24 is provided with an opening 30 which is generally co-extensive with the opening 28 when the panel 24 is in the flat or relaxed position shown in FIG. 5. Similarly, the overlying front panel 26 is provided with an opening 32 which is co-extensive with the opening 30 when the panels are in the overlying, juxtaposed condition shown in FIGS. 2 and 5. The front panel openings 30 and 32 extend to the near side of the panel as shown.

A longitudinal groove 34 is formed in the underlying top panel near the hinge area 35 whereas a rolled and heat-fixed bead is formed along the longitudinal edge of the overlying front panel 26. The locations of the groove 34 and the bead 36 are such as to be complemental whereby the bead 36 fits into the groove 34 when the two panels are in the overlapping and juxtaposed condition shown in FIGS. 2 and 5.

The foregoing arrangement permits the protective device 20 to be flexed into the open condition as substantially shown in FIG. 4 and slipped onto the blade 16 while the blade remains attached to the drive shaft 14. The operator can thereafter remove the blade 16 from the drive shaft 14 without risk or fear of injury even though the operator may not be wearing gloves.

As shown in FIG. 2, the protective device 20 is preferably provided with indicia 56 around the openings 30, 32 to show how and where a user might trim the opening to a larger size to accommodate a particular lawn mower structure. Trimming can be done with a blade type knife or with heavy shears. Similar indicia 58 may be provided near the open ends to indicate where and how a user might trim the protective device 20 in overall length to better fit a particular lawn mower blade.

Figure 3:
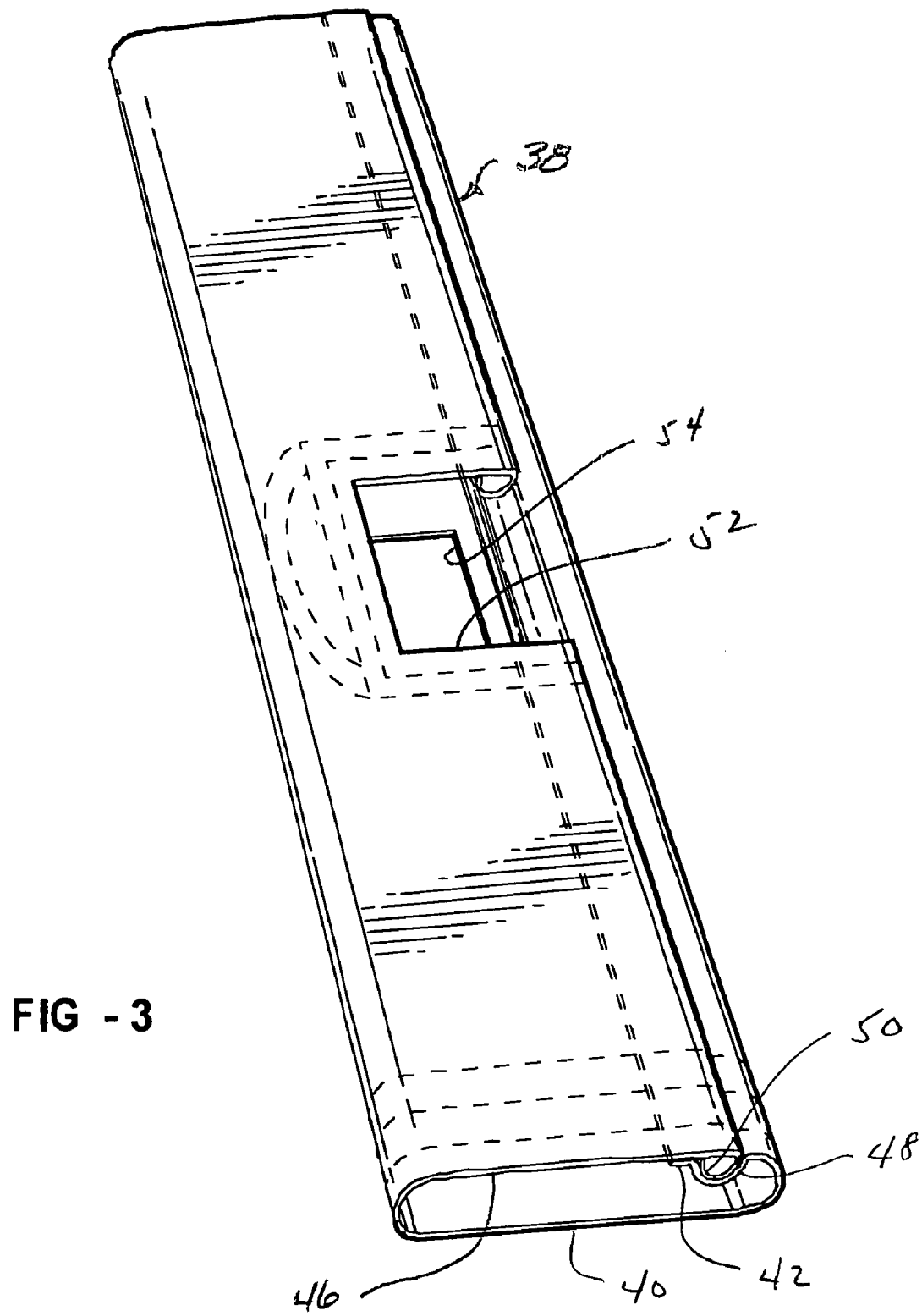
FIG. 3 is a perspective view of a second embodiment of the invention.
Figure 6:
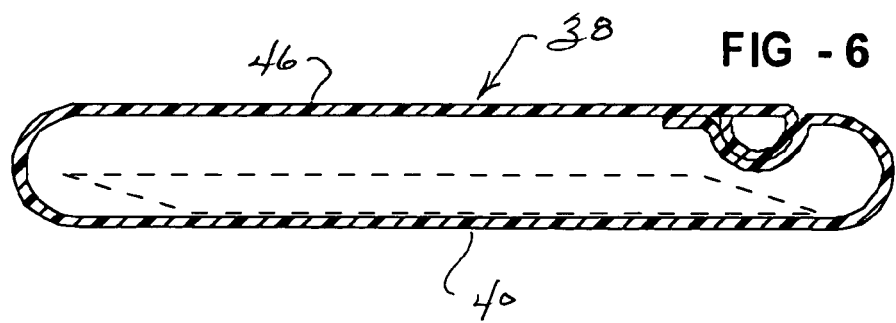
FIG. 6 is a cross-sectional view of the embodiment of FIG. 3.

FIGS. 3 and 6 illustrate an alternative embodiment in the form of a protective sleeve 38 also manufactured of extruded plastic sheet material which is heat formed to the shape illustrated in these figures. The protective device 38 of FIG. 3 comprises a back panel 40, a greatly reduced underlying front panel 42 and an overlapping front panel 46. Like the embodiment of FIG. 2 the underlying front panel is formed with a longitudinal groove whereas the top panel 46 is formed with a longitudinal bead 50 which fits into the groove to hold the overlapping panels in position. Apertures 54 and 52 are provided in the bottom and top panels 40 and 46 respectively, to accommodate the fastener 18 and drive shaft 14 as in the previous embodiment. The embodiment of FIG. 3 is of reduced material content, but provides equal protection to the user and somewhat simplifies installation by reducing the degree to which the shorter underlying panel 42 need be flexed.

It will be understood by persons skilled in the art that the invention has been described with reference to illustrative embodiments and that variations and modifications to these attachments may be made without departing from the spirit and scope of the invention as defined in the appended claims.

What is claimed is:

1. A protective device for a rotary lawn mower blade adapted to be attached to a mower drive shaft by a fastener on the shaft comprising:

a one-piece, open-ended envelope of flexible, shape-retaining material of approximately the length and width of a rotary lawn mower blade so as to be capable of receiving a blade substantially fully therewithin;

said envelope having a back panel and two front panels, one of the front panels being an overlying panel and the other being an underlying panel, said back panel and at least one of said front panels having generally co-extensive openings formed therein centrally between open ends.

2. A protective device as defined in claim 1 wherein the envelope is made of plastic having a relaxed condition in which the front panels are in overlying juxtaposition.

3. A protective device as defined in claim 2 further comprising complemental bead and groove features on the inside of one of said front panels and the outside of the other of said front panels.

4. A protective device as defined in claim 1 wherein the front panels are approximately the same width so that the outer front panel fully overlies the inner front panel.

5. A protective device as defined in claim 1 wherein the underlying front panel is of lesser width than the overlying front panel.

6. A protective device as defined in claim 1 further including indicia for one or more trim locations around said openings.

7. A protective device as defined in claim 1 further including indicia for altering the length of said envelope.

* * * * *